A. L. Whitney,
Potato Masher,
N° 54,987. Patented May 22, 1866.
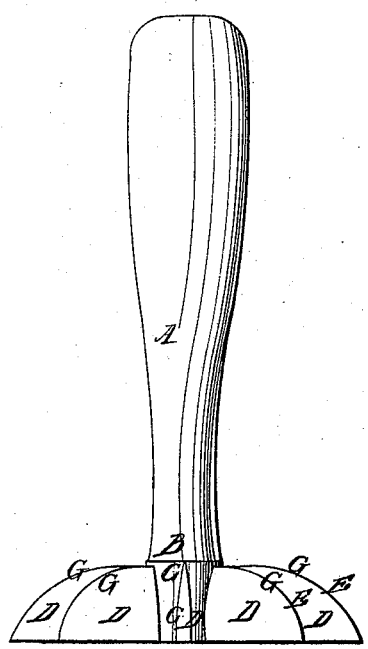
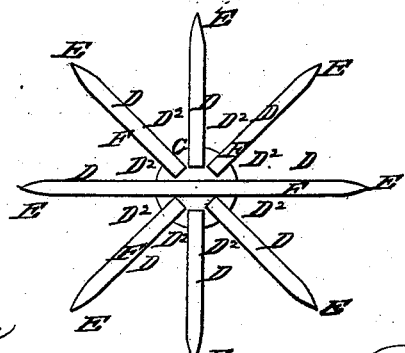

UNITED STATES PATENT OFFICE.

ANTHONY L. WHITNEY, OF BROOKLYN, NEW YORK.

IMPROVED POTATO-MASHER.

Specification forming part of Letters Patent No. 54,987, dated May 22, 1866.

*To all whom it may concern:*

Be it known that I, A. L. WHITNEY, of Brooklyn, county of Kings, and State of New York, have invented a new and Improved Potato-Masher; and I do hereby declare that the following is a full, clear, and exact description thereof, which will enable others skilled in the art to make and use the same, reference being had to the accompanying drawings, forming part of this specification.

The present invention relates to an extremely novel and useful implement, especially intended to be used for the mashing of potatoes, turnips, squashes, and other vegetables, which, as articles of food or of the diet, it is desirable oftentimes to mash or to reduce to a pulpy state.

In accompanying plate of drawings my improved implement is illustrated, Figure 1 being a side elevation, and Fig. 2 a view of its bottom or lower end.

Similar letters of reference indicate like parts.

A in the drawings represents the handle of the implement, which is to be made of any suitable shape to be conveniently handled or grasped by the hand, and of wood or other suitable material. To this handle, at its lower end, B, a head or cap, C, is fastened, in which cap a series of radial arms, D, are secured, made of equal lengths and placed at equal distances apart, with spaces $D^2$ between each, which arms project from the head at right angles to the same and have their outer ends, E, made of a curved shape with their lower edges, F, flat and in the same plane with each other, and their upper edges beveling and coming to sharp edges G.

In using this implement above described it is taken in the hand by its handle A, and then its series of arms D brought to bear against the potatoes, squashes, turnips, or other vegetables or other materials which are to be mashed, by pressing them down upon the same, the arms breaking up the vegetables, portions of which pass upward through the spaces between the several arms as it is forced down, when, having reached the bottom of the vessel in which the vegetables are placed, the implement is withdrawn by raising it, and again brought down upon the vegetables, as before, and so on until they have been sufficiently mashed or reduced to a pulpy state, the sharp or beveling edges of the arms D, as they move upward in the vegetables, cutting through the same without lifting or carrying any portion or quantity of the same with them, a quite important advantage, as is obvious.

Having thus described my invention so far as the same has been perfected, I claim as new—

An implement consisting of a suitable handle and provided with a series of arms, D, constructed, arranged, and operating substantially in the manner described, and for the purpose specified.

ANTHONY L. WHITNEY.

Witnesses:
 ALBERT W. BROWN,
 JAS. A. SERVICE.